US008324300B2

(12) United States Patent
Adochio et al.

(10) Patent No.: US 8,324,300 B2
(45) Date of Patent: Dec. 4, 2012

(54) TRANSPARENT, COLORLESS INFRARED RADIATION ABSORBING COMPOSITIONS COMPRISING NANOPARTICLES

(75) Inventors: William Adochio, Edmond, OK (US); Gregory T. Gaudet, Newark, IL (US); Daniel E. Rardon, Pittsburgh, PA (US); Mark A. Still, Firestone, CO (US)

(73) Assignee: PPG Industries Ohio, Inc, Cleveland, OH (US)

( * ) Notice: Subject to any disclaimer, the term of this patent is extended or adjusted under 35 U.S.C. 154(b) by 0 days.

(21) Appl. No.: 12/690,325

(22) Filed: Jan. 20, 2010

(65) Prior Publication Data

US 2010/0184901 A1 Jul. 22, 2010

Related U.S. Application Data

(60) Provisional application No. 61/295,394, filed on Jan. 15, 2010, provisional application No. 61/145,798, filed on Jan. 20, 2009.

(51) Int. Cl.
*C08K 3/10* (2006.01)
(52) U.S. Cl. ........................................ 524/406; 977/773
(58) Field of Classification Search ................... 524/406
See application file for complete search history.

(56) References Cited

U.S. PATENT DOCUMENTS

| | | | |
|---|---|---|---|
| 3,407,032 A | 10/1968 | Ziering | |
| 3,733,309 A | 5/1973 | Wyeth et al. | |
| 4,157,924 A | 6/1979 | Elms et al. | |
| 4,186,036 A | 1/1980 | Elms et al. | |
| 4,421,677 A | 12/1983 | Bianchin et al. | |
| 4,731,264 A | 3/1988 | Lin et al. | |
| 4,753,827 A | 6/1988 | Yoldas et al. | |
| 4,754,012 A | 6/1988 | Yoldas et al. | |
| 4,799,963 A | 1/1989 | Basil et al. | |
| 4,814,017 A | 3/1989 | Yoldas et al. | |
| 5,035,745 A | 7/1991 | Lin et al. | |
| 5,106,796 A | 4/1992 | Drozdyk et al. | |
| 5,115,023 A | 5/1992 | Basil et al. | |
| 5,137,575 A | 8/1992 | Yasuki et al. | |
| 5,199,979 A | 4/1993 | Lin et al. | |
| 5,231,156 A | 7/1993 | Lin | |
| 5,253,101 A | 10/1993 | Demiryont | |
| 5,344,712 A | 9/1994 | Basil et al. | |
| 5,401,579 A | 3/1995 | Basil et al. | |
| 5,749,937 A | 5/1998 | Detering et al. | |
| 5,788,738 A | 8/1998 | Pirzada et al. | |
| 5,851,507 A | 12/1998 | Pirzada et al. | |
| 5,916,686 A | 6/1999 | Lin | |
| 5,935,293 A | 8/1999 | Detering et al. | |
| 5,984,997 A | 11/1999 | Bickmore et al. | |
| 6,106,605 A | 8/2000 | Basil et al. | |
| 6,180,248 B1 | 1/2001 | Basil et al. | |
| 6,202,471 B1 | 3/2001 | Yadav et al. | |
| 6,228,904 B1 | 5/2001 | Yadav et al. | |
| 6,264,859 B1 | 7/2001 | Basil et al. | |
| 6,277,187 B1 | 8/2001 | Kuno et al. | |
| 6,344,271 B1 | 2/2002 | Yadav et al. | |
| 6,355,189 B1 | 3/2002 | Basil et al. | |
| RE37,853 E | 9/2002 | Detering et al. | |
| 6,469,119 B2 | 10/2002 | Basil et al. | |
| 6,513,362 B1 | 2/2003 | Yadav et al. | |
| 6,602,595 B2 | 8/2003 | Yadav et al. | |
| 6,623,791 B2 | 9/2003 | Sadvary et al. | |
| 6,830,822 B2 | 12/2004 | Yadav | |
| 7,220,793 B2 | 5/2007 | Vanier et al. | |
| 7,258,706 B2 | 8/2007 | Kambe et al. | |
| 7,300,967 B2 | 11/2007 | Xia | |
| 7,368,523 B2 | 5/2008 | Xia et al. | |
| 7,399,571 B2 | 7/2008 | Bogerd et al. | |
| 7,559,494 B1 | 7/2009 | Yadav et al. | |
| 7,601,331 B2 | 10/2009 | Chow et al. | |
| 7,708,974 B2 | 5/2010 | Yadav | |
| 7,713,350 B2 | 5/2010 | Yadav | |
| 7,816,006 B2 | 10/2010 | Yadav et al. | |
| 2003/0158316 A1* | 8/2003 | Vanier et al. | 524/430 |
| 2004/0180203 A1 | 9/2004 | Yadav et al. | |
| 2006/0068080 A1 | 3/2006 | Yadav et al. | |
| 2006/0178254 A1* | 8/2006 | Takeda et al. | 501/1 |
| 2006/0181774 A1* | 8/2006 | Ojima et al. | 359/586 |
| 2006/0251996 A1* | 11/2006 | Bogerd et al. | 430/323 |
| 2007/0187653 A1 | 8/2007 | Takeda et al. | |
| 2007/0203279 A1 | 8/2007 | Jarvis et al. | |
| 2008/0116426 A1 | 5/2008 | Adachi | |
| 2009/0035583 A1 | 2/2009 | Fisher | |
| 2010/0310787 A1 | 12/2010 | Lehmann et al. | |

FOREIGN PATENT DOCUMENTS

| | | |
|---|---|---|
| CA | 2000880 A | 10/1989 |
| EP | 0368567 A2 | 5/1990 |
| EP | 1847635 A1 | 10/2007 |
| EP | 1859674 A1 | 11/2007 |
| JP | 2000233929 A | 8/2000 |
| JP | 2008150548 A | 7/2008 |
| JP | 2008156386 A | 7/2008 |
| WO | WO0066485 A1 | 11/2000 |
| WO | WO2007094019 A1 | 8/2007 |

(Continued)

OTHER PUBLICATIONS

F.G.K. Baucke et al., Optical Absorption of Tungsten Bronze Thin Films for Electrochromic Applications, Thin Solid Films, (1990), pp. 47-51, vol. 186, Elsevier Sequoia, The Netherlands.
H. Belatel et al., Catalytic reactions of methylcyclohexane (MCH), on partially reduced tungsten oxide(s), Applied Catalysis A: General, (2007), pp. 227-233, vol. 318, Elsevier B.V.
L. Berggren, "Optical Absorption and Electrical Conductivity in Lithium Intercalated Amorphous Tungsten Oxide Films", Acta Universitatis Upsaliensis Uppsala, Comprehensive Summaries of Uppsala Dissertations from the Faculty of Science and Technology, (2004), vol. 1045, pp. 1-73, Uppsula. ISBN 91-554-6106-9.
L. Berggren et al., "Polaron absorption in amorphous tungsten oxide films", Journal of Applied Physics, Aug. 2001, vol. 90, No. 4, pp. 1860-1863.

(Continued)

*Primary Examiner* — Doris Lee
(74) *Attorney, Agent, or Firm* — Alan G. Towner

(57) ABSTRACT

Disclosed are compositions that include a binder and non-stoichiometric tungsten oxide particles dispersed in the binder. The tungsten oxide particles have an average primary particle size of no more than 300 nanometers. The compositions are transparent and colorless.

19 Claims, No Drawings

FOREIGN PATENT DOCUMENTS

| | | |
|---|---|---|
| WO | WO2008127409 A2 | 10/2008 |
| WO | WO2009059900 A2 | 5/2009 |

OTHER PUBLICATIONS

S. Colque et al., "Preparation of tungsten carbides on silica-evidence of coupling effects during reduction/carburization of tungsten oxide", Solid States Ionics, (1993), vol. 63-65, pp. 122-127, Elsevier Science Publishers B.V.

J. Ederth et al., "Small polaron formation in porous WO 3-X nanoparticle films", Journal of Applied Physics, (Nov. 2004), No. 10, vol. 96, pp. 5722-5726.

G.L. Frey et al., "Investigations of Nonstoichiometric Tungsten Oxide Nanoparticles", Journal of Solid State Chemistry, (2001), vol. 162, pp. 300-314, Elsevier Science.

R. Gehlig et al., "XPS Studies on WO2.90 and WO2.72 and the Influence of Metallic Impurities", Journal of Solid State Chemistry, (1983), vol. 49, pp. 318-324, Academic Press, Inc.

F. Gobal, "Surface Acidity of Reduced Tungsten Oxide", J. Chem. Research (S), 1980, pp. 182-183.

X. Huang et al., "Experimental and Theoretical Characterization of Superoxide Complexes [W2O6(O2-)] and [W3O9-(O2-)]:Models for the Interaction of O2 with Reduced W Sites on Tungsten Oxide Surfaces", Angew, Chem, Int, Ed., 2006, vol. 45, pp. 657-660, Wiley-VCH Verlag GmbH & Co., KGaA, Weinheim.

A. Katrib et al., "The multi-surface structure and catalytic properties of partially reduced WO3, WO2 and WC+O2 or W+O2 as characterized by XPS" Journal of Electron Spectroscopy and Related Phenomena, (1995), vol. 76, pp. 195-200, Elsevier Science B.V.

A.B. Kiss, Infrared Vibrational Frequencies of Reduced Tungsten Oxides WO3-x ($1 \geq x > 0$), Acta Chimica Academiae Scientiarum Hungaricae, (1975), vol. 84 (4), pp. 393-407, Budapest.

A.B. Kiss, "Vibration Frequencies of WO3-x ($1 \geq x > 0$) Reduced Tungsten Oxides", Acta Technica Academiae Scientiarum Hungaricae, (1974), vol. 78 (3-4), pp. 293-308.

P.J. Kulesza et al, "Electrocatalysis at a Novel Electrode Coating of Nonstoichiometric Tungsten (VI, V) Oxide Aggregates" J. Am. Chem. Soc., 1988, vol. 110, pp. 4905-4913.

S. Penner et al., "The structure and composition of oxidized and reduced tungsten oxide thin films", Thin Solid Films, vol. 516, (2008), pp. 2829-2836, Elsevier B.V.

P. Schlotter, "High Contrast Electrochromic Tungsten Oxide Layers", Solar Energy Materials, (1987), vol. 16, pp. 39-46, Elsevier Science Publishers B.V., North Holland, Amsterdam.

H. Takeda et al., "Near Infrared Absorption of Tungsten Oxide Nanoparticle Dispersions", J. Am. Ceram. Soc., (2007), vol. 90, Issue 12, pp. 4059-4061.

X. Yang et al., "Influence of Tungsten Precursors on the Structure and Catalytic Properties of WO3/SBA-15 in the Selective Oxidation of Cyclopentene to Glutaraldehyde", J. Phys. Chem. C (2008) vol. 112, pp. 3819-3826.

Li s.; Germanenko I.N.; El-Shall M.S.; "Nanoparticles from the Vapor Phase: Synthesis and Characterization of Si, GE, MoO3, and WO3 Nanocrystals"; Journal of Cluster Science, Dec. 1999, pp. 533-547, vol. 10, No. 4, Spring, Dover, USA.

* cited by examiner

TRANSPARENT, COLORLESS INFRARED RADIATION ABSORBING COMPOSITIONS COMPRISING NANOPARTICLES

CROSS REFERENCE TO RELATED APPLICATION

This application claims priority to U.S. Provisional Application Ser. No. 61/295,394 filed Jan. 15, 2010 and U.S. Provisional Application Ser. No. 61/145,798 filed Jan. 20, 2009, which are both incorporated herein by reference.

FIELD OF THE INVENTION

The present invention relates to transparent and colorless compositions that absorb infrared radiation and that comprise nanoparticles comprising non-stoichiometric tungsten oxide particles.

BACKGROUND INFORMATION

Compositions with enhanced capacity to absorb infrared ("IR") radiation are desired in many applications, such as for solar control films for architectural and automobile glass, reheat additives in polymers, and additives to increase the drying and/or cure rate of polymeric coating compositions, among others. As a result, IR absorbing materials, such as indium tin oxide, antimony tin oxide, titanium nitride, and lanthanum hexaboride particles are often included in such compositions. For many applications, however, such particles do not provide a sufficiently high level of IR radiation absorption in the wavelength range of ~800 to 1400 nanometers, which is often of particular commercial importance. As a result, to achieve adequate performance, the IR absorbing particles must often be included in the composition in amounts such they impart an undesired color to the composition in applications where colorless compositions are required. Moreover, since such additives are often relatively expensive, the cost impact of utilizing such additives in the required amount can often be prohibitive.

It would be desirable to provide optically clear IR radiation absorbing compositions comprising infrared absorbing particles dispersed in a binder in which the composition is transparent and colorless and exhibits excellent IR absorption in the wavelength range of ~800 to 1400 nanometers.

SUMMARY OF THE INVENTION

In certain respects, the present invention is directed to compositions of matter that are transparent and colorless. In some embodiments, the compositions of the present invention comprise: (a) a binder; and (b) no more than 500 parts per million, based on the total weight of the composition, of non-stoichiometric tungsten oxide particles having an average primary particle size of no more than 300 nanometers dispersed in the binder.

In other embodiments, the compositions of the present invention comprise: (a) a binder; and (b) generally spherical non-stoichiometric tungsten oxide particles having an average primary particle size of no more than 300 nanometers dispersed in the binder. These compositions of the present invention produce films that are transparent and colorless and have a surface resistance of greater than $1.0 \times 10^{10}$ Ω/square.

The present invention is also directed to, among other things, related injection stretch-blow molded articles and coated articles and methods.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to compositions that are transparent and colorless. As used herein, a composition is "transparent" if it has a luminous transmission in the visible region (400 to 800 nanometers) of at least 80 percent, such as at least 85 percent, or, in some cases, at least 90 percent of the incident light and is preferably free of haze to the human eye. As used herein, a composition is "colorless" if the human eye observes the composition as "true white" rather than a colored tone. For example, there would be no clear yellow, pink, or blue tones in the observed composition. In the transmissive mode this would require that the composition not absorb significantly more strongly in one or more 25-50 nanometer ranges of the visible portion of the electromagnetic spectrum (400 to 800 nanometers) than in other 25-50 nanometer ranges within the visible portion of the electromagnetic spectrum. Small percentage variations are of course tolerable so long as the eye does not observe them. This is usually exemplified by having an optical density of less than 0.2, such as less than 0.1, or, in some cases, less than 0.05, in a 50 nanometer range in the visible portion of the electromagnetic spectrum. These kinds of measurements can readily be taken by densitometers in reflective or transmissive mode.

As indicated, the compositions of the present invention comprise a binder. As used herein, the term "binder" refers to a continuous material in which tungsten oxide particles described herein are dispersed. In certain embodiments, the binder is a resinous binder such as those comprising, for example, thermoplastic compositions, thermosetting compositions, radiation curable compositions, as well as compositions comprising a metal alkoxide. The compositions of the present invention may be water-based or solvent-based liquid compositions, or, alternatively, in solid particulate form, i.e., a powder compositions.

In certain embodiments, the resinous binder included within the compositions of the present invention comprises a thermosetting resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents.

Thermosetting resins suitable for use in the compositions, such as coating compositions, of the present invention include, for example, those formed from the reaction of a polymer having at least one type of reactive group and a curing agent having reactive groups reactive with the reactive group(s) of the polymer. As used herein, the term "polymer" is meant to encompass oligomers, and includes, without limitation, both homopolymers and copolymers. The polymers can be, for example, acrylic, saturated or unsaturated polyester, polyurethane or polyether, polyvinyl, cellulosic, acrylate, silicon-based polymers, co-polymers thereof, and mixtures thereof, and can contain reactive groups such as epoxy, carboxylic acid, hydroxyl, isocyanate, amide, carbamate and carboxylate groups, among others, including mixtures thereof.

Suitable acrylic polymers include, for example, those described in United States Patent Application Publication 2003/0158316 A1 at [0030]-[0039], the cited portion of which being incorporated herein by reference. Suitable polyester polymers include, for example, those described in United States Patent Application Publication 2003/0158316 A1 at [0040]-[0046], the cited portion of which being incorporated herein by reference. Suitable polyurethane polymers include, for example, those described in United States Patent Application Publication 2003/0158316 A1 at [0047]-[0052], the cited portion of which being incorporated herein by reference. Suitable silicon-based polymers are defined in U.S. Pat. No. 6,623,791 at col. 9, lines 5-10, the cited portion of which being incorporated herein by reference.

In other embodiments, the film-forming resin included within the coating compositions of the present invention comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

Suitable thermoplastic resins include, without limitation, those usable for coating compositions and for injection molding of articles such as container preforms and the like. Examples of such resins include, but are not limited to, polyesters, polycarbonates, polyamides, polyolefins, polystyrenes, vinyl polymers, acrylic polymers and copolymers and blends thereof. In certain embodiments, the thermoplastic resin comprises a polyester, polypropylene and/or oriented polypropylene which may suitably be used to produce containers. In certain embodiments, the binder comprises a thermoplastic polyester as used to make liquid containers, such as beverage bottles, such as poly(ethylene terephthalate) or a copolymer thereof. In such embodiments, the compositions of the present invention can be used in producing preforms such as container preforms before the preforms are heated or inserted into a stretch-blow molding machine. Suitable polyethylene terephthalate resins include, for example, those described in United States Patent Application Publication No. 2007/0203279 at [0063], the cited portion of which being incorporated herein by reference.

Injection molding of polyethylene terephthalate and other polyester molding compositions is often carried out using an injection molding machine and a maximum barrel temperature in the range of from 260° C. to 285° C. or more, for example, up to about 310° C. The dwell time at this maximum temperature is often in the range of from 15 seconds to 5 minutes or more, such as 30 seconds to 2 minutes.

In certain embodiments, the binder comprises a radiation curable composition. As used herein, the term "radiation-curable composition" refers to a composition that comprises a radiation curable polymer and/or monomer. As used herein, the term "radiation curable polymer and/or monomer" refers to monomers and/or polymers having reactive components that are polymerizable by exposure to an energy source, such as an electron beam (EB), ultraviolet light, or visible light.

In certain embodiments, the radiation curable composition comprises a multi-functional (meth)acrylate. As used herein, the term "multi-functional (meth)acrylate" refers to monomers and/or oligomers having an acrylate functionality of greater than 1. In the certain of the compositions of the present invention, upon exposure to radiation, a radical induced polymerization of the multi-functional (meth)acrylate occurs. As used herein, "(meth)acrylate" and terms derived therefrom are intended to include both acrylates and methacrylates.

Suitable radiation curable oligomers and polymers include (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated melamine (i.e., melamine (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Suitable (meth)acrylated aliphatic urethanes include di(meth)acrylate esters of hydroxy terminated isocyanate extended aliphatic polyesters or aliphatic polyethers. (Meth)acrylated polyesters include the reaction products of (meth)acrylic acid with an aliphatic dibasic acid/aliphatic diol-based polyester.

Examples of commercially available (meth)acrylated urethanes and polyesters include those commercially available from Henkel Corp., Hoboken, N.J. under the trade designation "Photomer"; commercially available from UCB Radcure Inc., Smyrna, Ga. under the trade designation "Ebecryl" series 284, 810, 4830, 8402, 1290, 1657, 1810, 30 2001, 2047, 230, 244, 264, 265, 270, 4833, 4835, 4842, 4866, 4883, 657, 770, 80, 81, 811, 812, 83, 830, 8301, 835, 870, 8800, 8803, 8804; commercially available from Sartomer Co., Exton, Pa. under the trade designation "Sartomer CN" series CN964 B-85, CN292, CN704, CN816, CN817, CN818, CN929, CN944B-85, CN945A-60, CN945B-85, CN953, CN961, CN962, CN963, CN 965, CN966, CN968, CN980, CN981, CN982, CN983, CN984, CN985; commercially available from Akcross Chemicals, New Brunswick, N.J. under the trade designation "Actilane"; and commercially available from Morton International, Chicago, Ill. under the trade designation "Uvithane".

Suitable acrylated acrylics include, for example, acrylic oligomers or polymers that have reactive pendant or terminal (meth)acrylic acid groups capable of forming free radicals for subsequent reaction. Examples of commercially available (meth)acrylated acrylics include those commercially available from UCB Radcure Inc. under the trade designation "Ebecryl" series 745, 754, 767, 1701, and 1755.

Another suitable radiation curable oligomer is a polyester polyurethane oligomer that is the reaction product of an aliphatic polyisocyanate comprising two or more isocyanate groups; and a radiation curable alcohol comprising one or more radiation curable moieties, one or more hydroxyl moieties, and one or more polycaprolactone ester moieties. The polyisocyanate often comprises 2,2,4-trimethylhexamethylene diisocyanate; 2,4,4-trimethylhexamethylene diisocyanate, and mixtures thereof employed in combination with at least one of isophorone diisocyanate and/or an isocyanate functional isocyanurate.

Multi-functional (meth)acrylate monomers are also suitable for use in the compositions of the present invention and include, without limitation, difunctional, trifunctional, tetrafunctional, pentafunctional, hexafunctional (meth)acrylates and mixtures thereof.

Representative examples of suitable difunctional and trifunctional (meth)acrylate monomers include, without limitation, ethylene glycol di(meth)acrylate, 1,3-butylene glycol di(meth)acrylate, 1,4-butanediol diacrylate, 2,3-dimethylpropane 1,3-diacrylate, 1,6-hexanediol di(meth)acrylate, dipropylene glycol diacrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, tripropylene glycol di(meth)acrylate, thiodiethylene glycol diacrylate, trimethylene glycol dimethacrylate, pentaerythritol tri(meth)acrylate, trimethylolpropane tri(meth)acrylate, glycerolpropoxy tri(meth)acrylate, ethoxylated trimethylolpropane tri(meth)acrylate, and tetraethylene glycol di(meth)acrylate and mixtures thereof.

Representative examples of suitable tetra functional (meth) acrylate monomers include, but are not limited to, di-trimethylolpropane tetraacrylate, ethoxylated 4-pentaerythritol tetraacrylate, pentaerythritol ethoxylate tetraacrylate, pentaerythritol propoxylate tetraacrylate, including mixtures thereof.

Representative examples of suitable penta functional and hexa functional (meth)acrylate monomers include, but are not limited to, dipentaerythritol pentaacrylate, dipentaerythritol ethoxylate pentaacrylate, and dipentaerythritol propoxylate pentaacrylate, dipentaerythritol hexaacrylate, and mixtures of any of the foregoing.

In certain embodiments of the present invention, the binder comprises a metal alkoxide. In certain embodiments, the binder comprises an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero. Examples of suitable organic radicals include, but are not limited to, alkyl, vinyl, methoxyalkyl, phenyl, γ-glycidoxy propyl and γ-methacryloxy propyl. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, all of which are incorporated by reference herein.

In certain embodiments, the alkoxide comprises a combination of a glycidoxy[($C_1$-$C_3$)alkyl]tri($C_1$-$C_4$)alkoxysilane monomer and a tetra($C_1$-$C_6$)alkoxysilane monomer. Glycidoxy[($C_1$-$C_3$)alkyl]tri($C_1$-$C_4$)alkoxysilane monomers suitable for use in the coating compositions of the present invention include glycidoxymethyltriethoxysilane, α-glycidoxyethyltrimethoxysilane, α-glycidoxyethyl-triethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, hydrolysates thereof, or mixtures of such silane monomers.

Suitable tetra($C_1$-$C_6$)alkoxysilanes that may be used in combination with the glycidoxy[($C_1$-$C_3$)alkyl]tri($C_1$-$C_4$) alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane and mixtures thereof.

In certain embodiments, the glycidoxy[($C_1$-$C_3$)alkyl]tri($C_1$-$C_4$)alkoxysilane and tetra($C_1$-$C_6$)alkoxysilane monomers used in the coating composition of the present invention are present in a weight ratio of glycidoxy[($C_1$-$C_3$)alkyl]tri($C_1$-$C_4$)alkoxysilane to tetra($C_1$-$C_6$)alkoxysilane of from 0.5:1 to 100:1, such as 0.75:1 to 50:1 and, in some cases, from 1:1 to 5:1.

Appropriate mixtures of the various binder materials described herein may also be used in the preparation of the compositions of the present invention.

In certain embodiments, the binder is present in the compositions of the present invention in an amount of at least 10 percent by weight, such as at least 30 percent by weight, at least 50 percent by weight, at least 90 percent by weight, or, in some cases, at least 95 percent by weight, at least 99 percent by weight, or, in yet other cases, at least 99.9 percent by weight, or at least 99.95 percent by weight. In certain embodiments, the binder is present in the compositions of the present invention in an amount of no more than 99.99 percent by weight, such as no more than 99.9 percent by weight, no more than 99 percent by weight or no more than 90 percent by weight. The amount of the binder present in the compositions of the present invention can range between any combination of the recited values inclusive of the recited values.

As previously indicated, the compositions of the present invention also comprise non-stoichiometric tungsten oxide particles dispersed in the binder. As used herein, the term "non-stoichiometric" refers to metastable materials which have a composition that is different than that required for stoichiometric bonding between two or more elements, such as is described in U.S. Pat. No. 6,344,271 ("the '271 patent") at col. 9, line 13 to col. 10, line 45, the cited portion of which being incorporated herein by reference. As described in the '271 patent, stoichiometric bonding between two or more elements indicates that charge balance is achieved among the elements. In general, therefore, stoichiometric tungsten oxide is $WO_3$, whereas non-stoichiometric tungsten oxide is $WO_{(3-z)}$, where $0<z$, such as $0.001 \leq z \leq 1$.

In the compositions of the present invention, the tungsten oxide particles have an average primary particle size of no more than 300 nanometers. Certain embodiments of the coating compositions of the present invention comprise tungsten oxide particles having an average primary particle size of no more than 200 nanometers, no more than 150 nanometers, no more than 100 nanometers, such as no more than 50 nanometers, or, in certain embodiments, no more than 30 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification and the Examples contained herein illustrate a suitable method for preparing a TEM image. The primary particle size of a particle refers to the smallest diameter sphere that will completely enclose the particle. As used herein, the term "primary particle size" refers to the size of an individual particle as opposed to an agglomeration of two or more individual particles.

In certain embodiments of the present invention, the tungsten oxide particles are of the general formula $WO_x$ where $2.2 \leq x \leq 2.999$, such as $2.65 \leq x \leq 2.95$. In some embodiments, the tungsten oxide particles are of the formula $WO_{2.72}$ or $WO_{2.9}$. In certain embodiments of the present invention, the tungsten oxide particles are of the general formula $M_xW_yO_z$ where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$, such as $0.001 \leq x/y \leq 0.1$ and $2.2 \leq z/y \leq 2.999$, such as $2.65 \leq z/y \leq 2.95$. In some embodiments, where the tungsten oxide particles are of the general formula $M_xW_yO_z$, z/y is 2.72 or 2.9. Such tungsten oxide particles are described in United States Patent Application Publication No. 2006/0178254 A1 at [0071] to [0087], the cited portion of which being incorporated herein by reference.

In certain embodiments, the tungsten oxide particles described above have a shape or morphology that is generally or substantially spherical. As used herein, the term "substantially spherical" refers to particles that have an average aspect ratio of no more than 4:1, such as no more than 3:1, in some cases no more than 2:1, and, in yet other cases no more than 1.5:1, 1.2:1 or 1.1:1.

The tungsten oxide particles that are included in the compositions of the present invention may be prepared by various methods known to those skilled in the art, including gas phase synthesis processes, such as, for example, flame pyrolysis, hot walled reactor, chemical vapor synthesis, among other methods. In certain embodiments, however, such particles are prepared by reacting together one or more organometallic and/or metal oxide precursors in a fast quench plasma system. In certain embodiments, the particles may be formed in such a system by: (a) introducing materials into a plasma chamber; (b) rapidly heating the materials by means of a plasma to yield a gaseous product stream; (c) passing the gaseous product stream through a restrictive convergent-divergent nozzle to effect rapid cooling and/or utilizing an alternative cooling method, such as a cool surface or quenching stream, and (d) condensing the gaseous product stream to yield ultrafine solid particles. Certain suitable fast quench plasma systems and methods for their use are described in U.S. Pat. Nos. 5,749,937, 5,851,507, 5,935,293, 5,788,738, 5,984,997, 6,602,595 and RE37,853 E and U.S. Patent Application Publication No. 2006/0099146, which are incorporated herein by reference. The tungsten oxide particles may also be produced by a method described in United States Patent Application Publication No. 2006-0178254 A1 at [0088] to [0100], the cited portion of which being incorporated herein by reference.

In other embodiments, the tungsten oxide particles are made by a wet chemistry method, such as, for example, sol-gel processes, precipitation processes, wet grinding processes, inverse-micelle methods, and combinations of these processes. See, e.g., Beck and Siegel, "The Dissociative Adsorption of Hydrogen Sulfide over Nanophase Titanium Dioxide," J. Mater. Res., 7, 2840 (1992), and Steigerwald and Brus, "Synthesis, Stabilization, and Electronic Structure of Quantum Semiconductor Nanoclusters," Ann. Rev. Mater. ScL, 19, 471 (1989).

Reduced forms of non-stoichiometric tungsten-oxide can also be prepared by various methods. In some embodiments, the reduced form of non-stoichiometric tungsten-oxide can be produced in situ by the methods described above via the introduction of a reducing material. In other embodiments, non-stoichiometric tungsten particles can be post processed in a reducing atmosphere such as a fluidized bed reactor and the like.

In the compositions of the present invention the tungsten oxide particles are present in the composition in an amount of no more than 500 parts per million (0.05 percent by weight), such as no more than 250 parts per million (0.025 percent by weight), or in some cases, no more than 150 parts per million (0.015 percent by weight), or, in yet other cases, no more than 100 parts per million (0.01 percent by weight), based on the total weight of the composition. In certain embodiments, the tungsten oxide particles are present in the composition in an amount of at least at least 0.5 part per million (0.00005 percent by weight) or at least 1 part per million (0.0001 percent by weight) or, in some cases, at least 5 parts per million (0.005 percent by weight), based on the total weight of the composition. In some embodiments, the amount may be at least 10 parts per million (0.001 percent by weight), in some cases at least 20 parts per million (0.002 percent by weight), or even at least 25 parts per million (0.0025 percent by weight), based on the total weight of the composition. The amount of the binder present in the compositions of the present invention can range between any combination of the recited values inclusive of the recited values.

In certain embodiments, the compositions of the present invention also comprise other IR absorbing particles, indium tin oxide, antimony tin oxide, titanium nitride, and lanthanum hexaboride particles, among others. Specific examples of suitable particles include, without limitation, any of those described in International Patent Application Publication No. WO 2008/127409, incorporated herein by reference in its entirety, as well as those described in United States Patent Application Publication No. 2007/0203279 at [0047] to [0058], U.S. Pat. No. 7,368,523 at col. 5, line 50 to col. 8, line 2, and U.S. Pat. No. 7,300,967 at col. 3, line 23 to col. 5, line 27, the cited portions of which being incorporated herein by reference.

In certain embodiments, the compositions of the present invention are non-conductive. In other words, these compositions of the present invention have a surface resistance of greater than $1.0 \times 10^{10}$ Ω/square. In these embodiments, the shape or morphology of the tungsten oxide particles described earlier is generally spherical, as described above, as opposed to acicular or tabular. Moreover, in these compositions, the particles are generally highly dispersed in the composition such that there are very few contact points between the tungsten oxide particles in the composition when formed into a film or other article. The use of non-conductive compositions allows for the production of films or other articles, such as container performs, that reflect little, if any, infrared energy, thereby resulting in the absorption of most, if not all, such energy to which the article is exposed, which results in efficient heating of the composition by such energy.

In certain embodiments, the figure of merit ("FOM") of the tungsten oxide particles described herein, when dispersed at 0.05 wt % (500 ppm) in ethylene glycol, is greater than or equal to 0.50, such as greater than or equal to 0.75, greater than or equal to 1.0, greater than or equal to 1.25, greater than or equal to 1.5, greater than or equal to 1.75, greater than or equal to 2.0, such as from 2.0 to 5.0. FOM is defined by the extinction of the composite material at 1100 nm ($\epsilon_{1100\ nm}$) divided by the extinction at 550 nm ($\epsilon_{550\ nm}$) wherein $\epsilon$ is approximated by Beer's Law (A=$\epsilon$C1), in which A is the absorbance or Optical Density (OD), C the concentration, and 1 is the path length.

In practice, the FOM may be determined by a ratio of ODs in which:

$$FOM=OD_{1100\ nm}/OD_{550\ nm}.$$

For this measurement, the spectrophotometer should be set to receive a 2 nm band pass. A higher FOM means that the nanocomposite does a better job of absorbing infrared light at 1100 nm while remaining transparent to visible light at 550 nm. The FOM is strongly affected by both the particle size and particle composition, although the FOM is not strongly affected by the nanoparticle loading in the composition.

In certain embodiments, the tungsten oxide particles present in the composition of the present invention have a particle size distribution, as measured by the ratio of D90/D50, of less than or equal to 2.0, such as less than or equal to 1.5, from 1.5 to 3.0, or, in some cases, from 1.75 to 2.25, wherein D90 represents a particle size in which 90% of the volume of tungsten oxide particles have a diameter smaller than the stated D90; and D50 represents a particle size in which 50% of the volume of tungsten oxide particles have a diameter smaller than the stated D50. For example, if D90 is 90 nm, and D50 is 60 nm, then D90/D50 is 1.5. For the tungsten oxide particle composition and average particle size, a composition with a lower D90/D50 will, in general, have a higher Figure-of-Merit. The D90/D50 ratio may be determined by a photosedimentation technique, such as measured by the LumiSizer instrument, sold by Lumi GMBH.

In certain embodiments, the compositions of the present invention may comprise one or more other ingredients typically used in coatings, injection molding, and other applications, such as crystallization aids, impact modifiers, surface lubricants, denesting agents, stabilizers, antioxidants, ultraviolet light absorbing agents, deactivators, nucleating agents, fillers, acetaldehyde reducing compounds, other reheat enhancing aids, and anti-abrasion additives.

A variety of articles can be made from certain embodiments of the compositions of the present invention, such as those in which reheat is neither necessary nor desirable. In some embodiments, articles include sheet, film, bottles, trays, other packaging, rods, tubes, lids, fibers and injection molded articles. In one embodiment, there is provided a beverage bottle containing and/or suitable for holding substances like a liquid. In another embodiment, there is provided a heat-set beverage bottle containing and/or suitable for holding beverages which are hot-filled into the bottle. In yet another embodiment, the bottle is containing and/or suitable for holding carbonated soft drinks. Further, in yet another embodiment, the bottle is containing and/or suitable for holding alcoholic beverages. In some embodiments, there is provided a preform. In some embodiments, there is provided a container containing a preform.

In certain embodiments, the compositions of the present invention comprise a plasticizer, such as, for example, dihexyl adipate, phosphoric acid ester, phthalic acid ester, and mixtures thereof. In some embodiments, the plasticizer concentration ranges up to 35% by weight of the composition.

In any of the embodiments, the D90/D50 ratio may be determined by a photosedimentation technique, such as measured by the LumiSizer instrument, sold by Lumi GMBH. Also, in any of the embodiments, the D90/D50 ratio may be varied by operating the nanoparticle production process to ensure homogenous conditions within the particle forming region of the process.

The compositions of the present invention may be prepared by any of a variety of techniques. In certain embodiments, the tungsten oxide particles may be introduced to the binder by chemical or mechanical methods. For example, the tungsten oxide particles may be introduced to a polymeric binder or introduced to monomers before or during their polymerization at a suitable time and location. Furthermore, the tungsten oxide particles may be introduced to a polymer or introduced to a monomer by mechanical mixing, shaking, stirring, grinding, ultrasound, etc., with or without the aid of a solvent system.

In certain embodiments, the method by which the tungsten oxide particles are introduced to the binder comprises adding the tungsten oxide particles to a polymer reactant system, during or after polymerization, to a polymer melt, or to a molding powder or pellets or molten polyester in the injection-molding machine from which bottle preforms are made. In some embodiments, the tungsten oxide particles may be added at locations including proximate the inlet to an esterification reactor, proximate the outlet of an esterification reactor, at a point between the inlet and the outlet of an esterification reactor, anywhere along a recirculation loop, proximate the inlet to a prepolymer reactor, proximate the outlet to a prepolymer reactor, at a point between the inlet and the outlet of a prepolymer reactor, proximate the inlet to a polycondensation reactor, or at a point between the inlet and the outlet of a polycondensation reactor, or at a point between the outlet of a polycondensation reactor and a die for forming pellets, sheets, fibers, or bottle preforms.

In certain embodiments, the tungsten oxide nanoparticles may be added to a polyester polymer, such as PET, and fed to an injection molding machine by any method, including feeding the tungsten oxide particles to the molten polymer in the injection molding machine, or by combining the tungsten oxide particles with a feed of PET to the injection molding machine, either by melt blending or by dry blending pellets. The tungsten oxide particles may be supplied as-is, or in a concentrate form in a polymer such as PET, or as a dispersion in a liquid or solid carrier. In some embodiments, examples of suitable carriers include polyethylene glycol, mineral oil, hydrogenated castor oil, and glycerol monostearate.

Alternatively, the tungsten oxide particles may be added to an esterification reactor, such as with and through the ethylene glycol feed optionally combined with phosphoric acid, to a prepolymer reactor, to a polycondensation reactor, or to solid pellets in a reactor for solid stating, or at any point in-between any of these stages. In some embodiments, the tungsten oxide particles may be combined with PET or its precursors as-is, as a concentrate containing PET, or diluted with a carrier. In some embodiments, the carrier may be reactive to PET or may be non-reactive. In some embodiments, the tungsten oxide particles, whether neat or in a concentrate or in a carrier, and the bulk polyester, may be dried prior to mixing together. In some embodiments, the tungsten oxide particles may be dried in an atmosphere of dried air or other inert gas, such as nitrogen, and if desired, under sub-atmospheric pressure.

The polyester compositions of the present invention may be used to form preforms used for preparing packaging containers. The preform is typically heated above the glass transition temperature of the polymer composition by passing the preform through a bank of quartz infrared heating lamps, positioning the preform in a bottle mold, and then blowing pressurized air through the open end of the mold.

In reheat blow-molding, bottle preforms, which are test-tube shaped injection moldings, are heated above the glass transition temperature of the polymer, and then positioned in a bottle mold to receive pressurized air through their open end. This technology is well known in the art, as shown, for example in U.S. Pat. No. 3,733,309, incorporated herein by reference. In a typical blow-molding operation, radiation energy from quartz infrared heaters is generally used to reheat the preforms.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular, vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co)polymers of (meth)acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The coating compositions of the present invention can be applied to such substrates by any of a variety of methods including dipping or immersion, spraying, intermittent spraying, dipping followed by spraying, spraying followed by dipping, brushing, or roll-coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film according to the present invention, therefore, comprises applying a coating composition of the present invention to the surface of a substrate or article to be coated, coalescing the coating composition to form a substantially continuous film and then curing the thus-obtained coating.

In some embodiments, the tungsten oxide particles can be functionalized depending on the particular application. For example, the tungsten oxide particles can be functionalized to bind or, in some embodiments, associate with a particular component of the coating. Such functionalization can speed polymerization by causing the tungsten oxide particles to associate with monomers to be polymerized. As another example, the surface of the tungsten oxide particles can be functionalized to be hydrophobic, hydrophilic, lipophilic, or lipophobic. Such particles can in some embodiments associate with some liquid component that is intended to be evaporated during drying. The tungsten oxide particles can also be functionalized to facilitate their dispersion.

Because the tungsten oxide particles can also absorb UV in addition to IR energy, they may slow or prevent degradation commonly caused by UV radiation. The resulting coating can also prevent heat from passing through the material. This application may be useful in applications where the coating is used to prevent the coated item from being heated or exposed to UV energy or energy from other portions of the electromagnetic spectrum. Thus, IR absorbing nanoparticles that absorb both UV and IR energy can assist in curing or drying and improve the long-term performance of the coating. In certain embodiments, the tungsten oxide particles absorb at least 50%, at least 75%, at least 85%, at least 90%, at least 95%, or at least 100% as much energy from a second portion of the UV electromagnetic spectrum as they absorb from the IR spectrum.

In certain embodiments, the present invention provides methods of drying or curing coatings using IR energy. Because the tungsten oxide particles described herein absorb IR energy, the IR energy may be transferred to the binder in the form of heat. Thus, the compositions comprising tungsten oxide particles described herein can result in faster curing compared to curing coatings without using the tungsten oxide particles. In certain embodiments, such methods comprise contacting a coating with the tungsten oxide particles described herein and exposing the coating to IR energy. The contacting can occur in any manner. In some embodiments, the tungsten oxide particles can be mixed with at least one component of the coating, such as one the binder or a solvent. The tungsten oxide particles or a dispersion of tungsten oxide particles in a medium, such as a solvent, can be dispersed into an already produced polymeric binder or into a monomer composition used to make a polymeric binder, thereby achieving uniform dispersion throughout the polymer and intimate contact in the final formulation of the coating.

The IR energy can be applied in any manner. In some embodiments, the IR energy is applied using an IR heat source, such as an IR lamp. IR lamps are commonly used and available to one of skill in the art. Ambient IR energy is suitable. The IR energy can also be applied by simply exposing the coating to some other light source. The other light source an be the light emitted by standard fluorescent lights or even sun light. Thus, the IR energy can be supplied in any manner, as long as the IR energy is sufficient to at least partially affect the curing or drying.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A composition comprising:
   (a) a binder; and
   (b) no more than 500 parts per million, based on the total weight of the composition, of non-stoichiometric tungsten oxide particles having an average primary particle size of no more than 300 nanometers dispersed in the binder wherein the composition produces a film having a surface resistance of greater than $1.0 \times 10^{10}$ Ω/square.

2. The composition of claim 1, wherein the composition is transparent.

3. The composition of claim 1, wherein the article is colorless.

4. The composition of claim 1, wherein the binder comprises a thermosetting composition comprising a polymer having at least one type of reactive group and a curing agent having reactive groups reactive with the reactive group(s) of the polymer.

5. The composition of claim 1, wherein the binder comprises a thermoplastic composition comprising poly(ethylene terephthalate) or a copolymer thereof.

6. The composition of claim 1, wherein the binder comprises a radiation curable composition comprising a multifunctional (meth)acrylate.

7. The composition of claim 1, wherein the tungsten oxide particles have an average primary particle size of no more than 150 nanometers.

8. The composition of claim 1, wherein the tungsten oxide particles are substantially spherical.

9. The composition of claim 1, wherein the tungsten oxide particles are present in the composition in an amount of no more than 150 parts per million and at least 0.5 part per million, based on the total weight of the article.

10. The composition of claim 1, wherein the tungsten oxide particles are of the general formula $WO_{2.2-2.999}$.

11. The composition of claim 10, wherein the tungsten oxide particles are of the general formula $WO_{2.65-2.95}$.

12. A composition comprising:
    (a) a binder; and
    (b) generally spherical non-stoichiometric tungsten oxide particles having an average primary particle size of no more than 300 nanometers dispersed in the binder,
    wherein the composition is transparent and colorless and produces a film having a surface resistance of greater than $1.0 \times 10^{10}$ Ω/square, and the generally spherical particles are present in the composition in an amount of no more than 500 parts per million, based on the total weight of the composition.

13. The composition of claim 12, wherein the binder comprises a thermosetting composition comprising a polymer having at least one type of reactive group and a curing agent having reactive groups reactive with the reactive group(s) of the polymer.

14. The composition of claim 12, wherein the binder comprises a thermoplastic composition comprising polyethylene terephthalate) or a copolymer thereof.

15. The composition of claim 12, wherein the binder comprises a radiation curable composition comprising a multifunctional (meth)acrylate.

16. The composition of claim 12, wherein the generally spherical particles have an average primary particle size of no more than 150 nanometers.

17. The composition of claim 12, wherein the generally spherical particles are present in the composition in an amount of no more than 150 parts per million and at least 0.5 part per million, based on the total weight of the composition.

18. The composition of claim 12, wherein the tungsten oxide particles are of the general formula $WO_{2.2-2.999}$.

19. The composition of claim 18, wherein the tungsten oxide particles are of the general formula $WO_{2.65-2.95}$.

* * * * *